United States Patent
Cryer et al.

(10) Patent No.: US 9,387,567 B2
(45) Date of Patent: Jul. 12, 2016

(54) CYLINDER LINER HAVING THREE-TIERED SURFACE FINISH

(75) Inventors: Edward Cryer, Homer Glen, IL (US); Farhan Ferozali Devani, Morton Grove, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 894 days.

(21) Appl. No.: 13/614,682

(22) Filed: Sep. 13, 2012

(65) Prior Publication Data

US 2014/0069272 A1 Mar. 13, 2014

(51) Int. Cl.
*F16J 10/04* (2006.01)
*B24B 33/02* (2006.01)

(52) U.S. Cl.
CPC . *B24B 33/02* (2013.01); *F16J 10/04* (2013.01)

(58) Field of Classification Search
CPC .............. F16J 10/04; F02F 1/20; F02B 79/00
USPC ............ 92/153, 158, 159, 193.2; 123/196 M, 123/668, 193.2
See application file for complete search history.

(56) References Cited

U.S. PATENT DOCUMENTS

| | | | |
|---|---|---|---|
| 3,657,078 A | 4/1972 | Schweikher | |
| 4,294,203 A | 10/1981 | Jones | |
| 5,701,861 A | 12/1997 | Hegemier et al. | |
| 6,041,749 A | 3/2000 | Lubbing et al. | |
| 6,158,407 A | 12/2000 | Mizutani | |
| 6,309,806 B1* | 10/2001 | Lenthall et al. | 430/323 |
| 7,104,240 B1 | 9/2006 | Vuk et al. | |
| 7,685,987 B2 | 3/2010 | Miyamoto et al. | |
| 7,685,991 B2* | 3/2010 | Cumming et al. | 123/305 |
| 7,726,273 B2 | 6/2010 | Azevedo et al. | |
| 2004/0226402 A1* | 11/2004 | Fuchs et al. | 74/828 |
| 2011/0023811 A1 | 2/2011 | Heilenbach et al. | |

FOREIGN PATENT DOCUMENTS

JP 02004176556 A 2/2004

* cited by examiner

*Primary Examiner* — Nathaniel Wiehe
*Assistant Examiner* — Abiy Teka
(74) *Attorney, Agent, or Firm* — Finnegan, Henderson, Farabow, Garrett & Dunner, LLP

(57) ABSTRACT

A cylinder assembly for use in an internal combustion engine is disclosed. The cylinder assembly may include a cylinder, a piston disposed within the cylinder, a plurality of piston rings encircling the piston, and a cylinder liner fitted around the piston in a cylindrical space in which the piston reciprocates. The piston may reciprocate within the cylinder along a longitudinal direction of the cylinder. The cylinder liner may include an upper section, a middle section, and a lower section. The upper section may be composed of a first texture; the middle section may be composed of a second texture that is rougher than the first texture; and the lower section may be composed of a third texture that is smoother than the first texture and the second texture.

19 Claims, 3 Drawing Sheets

CYLINDER LINER HAVING THREE-TIERED SURFACE FINISH

TECHNICAL FIELD

The present disclosure relates generally to a cylinder liner and, more particularly, to a cylinder liner having a three-tiered surface finish.

BACKGROUND

Internal combustion engines convert chemical energy in fuel into mechanical energy through a series of explosions within a combustion chamber of the engine. These explosions cause pistons of the engine to reciprocate within associated cylinders. Each piston is typically connected to a crankshaft by a connecting rod, such that movement of the piston results in rotation of the crankshaft. The cylinders can be arranged in two banks positioned at an angle to each other. Each bank usually includes a group of cylinders located on the same side of the crankshaft with their axes lying in a common plane passing through an axis of the crankshaft. Each piston is typically encircled by a plurality of piston rings, which are received by machined grooves defined in the outer surface of the piston and help to seal off the combustion chamber. A cylinder liner can be fitted in a cylindrical space in which the piston reciprocates to protect the cylinder from wear and degradation.

During engine operation, the cylinder liner forms a sliding surface for the piston and piston rings. Over time, the cylinder liner can experience wear from friction of the piston and piston rings and therefore degrade in performance. For example, the piston and/or the piston rings can scuff the liner by forming local microscopic welding to the cylinder liner. Cylinder liners fitted for uniflow two-stroke diesel engines can be particularly sensitive to wear induced by scuffing because hard particulates can be dragged along the cylinder liner after passing by intake ports in the cylinder wall. Scuffing can result in elevated friction and wear of the cylinder liner, which can reduce the durability, reliability, and efficiency of the engine.

Reducing cylinder liner wear is generally accomplished by ensuring that adequate lubrication exists between the piston and/or the piston rings and the cylinder liner. One attempt to provide lower friction and wear to cylinder liners is described in U.S. Pat. No. 7,104,240 to Vuk et al. ("Vuk") that issued on Sep. 12, 2006. Vuk discloses a cylinder liner that includes a plurality of discrete oil retaining indentations in a predefined pattern on its surface. Vuk aims to improve lubrication by arranging the distribution density of the discrete oil retaining indentations to correspond to the greatest lubrication needs of the cylinder liner. In particular, the discrete oil retaining indentations are more densely positioned at the longitudinal ends of the cylinder liner and less densely positioned at the longitudinal middle of the cylinder liner.

Although the discrete oil retaining indentations of Vuk may help reduce cylinder liner friction and wear, it may be less than optimal. This is because the configuration disclosed in Vuk may result in excessive oil being retained on the upper section of the cylinder liner. Excessive oil left on the upper section of the cylinder liner may subsequently be carried to the combustion chamber by the piston rings. The excessive oil may be burned during the combustion process and subsequently injected into the atmosphere as undesirable particulate emissions via an exhaust manifold of the engine. The particulate emissions produced by the discrete oil retaining indentations of Vuk may not meet governmental emission standards.

The cylinder liner of the present disclosure solves one or more of the problems set forth above and/or other problems in the art.

SUMMARY

In one aspect, the present disclosure is related to a cylinder assembly. The cylinder assembly may include a cylinder, a piston disposed within the cylinder, a plurality of piston rings encircling the piston, and a cylinder liner fitted around the piston in a cylindrical space in which the piston reciprocates. The piston may reciprocate within the cylinder along a longitudinal direction of the cylinder. The cylinder liner may include an upper section, a middle section, and a lower section. The upper section may be composed of a first texture. The middle section may be composed of a second texture that is rougher than the first texture. The lower section may be composed of a third texture that is smoother than the first texture and the second texture.

In another aspect, the present disclosure may be related to a cylinder liner. The cylinder liner may include an upper section, a middle section, and a lower section. The upper section may be composed of a first texture. The middle section may be composed of a second texture that is rougher than the first texture. The lower section may be composed of a third texture that is smoother than the first texture and the second texture.

DETAILED DESCRIPTION

Figure 1:
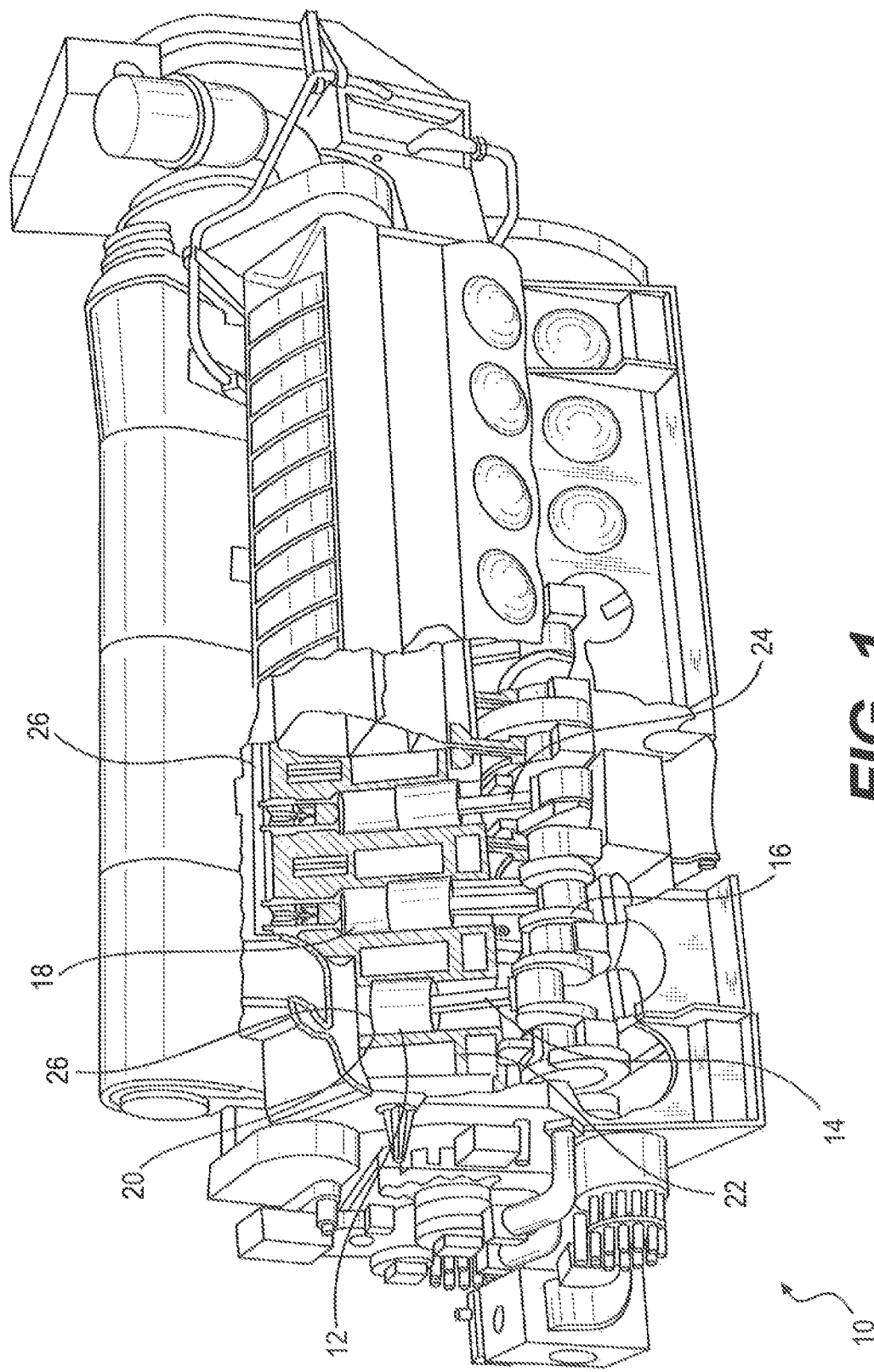
FIG. 1 is a cut-away perspective view illustration of an exemplary disclosed two-stroke engine.

FIG. 1 illustrates an exemplary embodiment of an engine 10 that may be, for example, a diesel engine, a gasoline engine, or a gaseous fuel-powered engine. Engine 10, in this embodiment, is a two-cycle diesel engine associated with a locomotive (not shown). Engine 10 may include, among other things, an assembly of pistons 12, connecting rods 14, and a crankshaft 16. Each piston 12 may be connected to crankshaft 16 by a corresponding one of connecting rods 14, such that movement of piston 12 results in rotation of crankshaft 16. These components may operate together to transform chemical energy in fuel into useful rotational motion of crankshaft 16 through a series of explosions within combustion chambers 18 of engine 10. These explosions may cause pistons 12 and connecting rods 14 of engine 10 to reciprocate within cylinders 20. In this manner, cylinders 20 may serve as pressure vessels in which the process of combustion takes place and as guides for pistons 12 sliding within them.

Cylinders 20 may be arranged within a cylinder block 22 in two banks positioned at an angle to each other. Each bank may include a group of cylinders 20 located on the same side of crankshaft 16 with their axes lying in a common plane passing through an axis of crankshaft 16. Each cylinder 20 may be sealed at its top by a cylinder head 26. Piston 12, reciprocable within cylinder 20, may thus define a variable-volume combustion chamber 18.

Cylinder 20 may be sealed at its bottom by piston 12 and a plurality of piston rings (not shown). The piston rings may help to seal off combustion chamber 18 and may be received by machined grooves defined in an outer surface of piston 12. For example, each piston 12 may have four compression rings on an upper portion to seal cylinder 20 from cylinder block 22. This arrangement may guard against combustion gases leaking past piston 12 into cylinder block 22 and may provide a means by which surplus heat may be transmitted from piston 12 to the walls of cylinder 20. Piston 12 may also have two oil control rings positioned on a lower portion to control lubrication and prevent excess oil consumption by effectively distributing the lubricating oil on the walls of cylinder 20.

Figure 2:
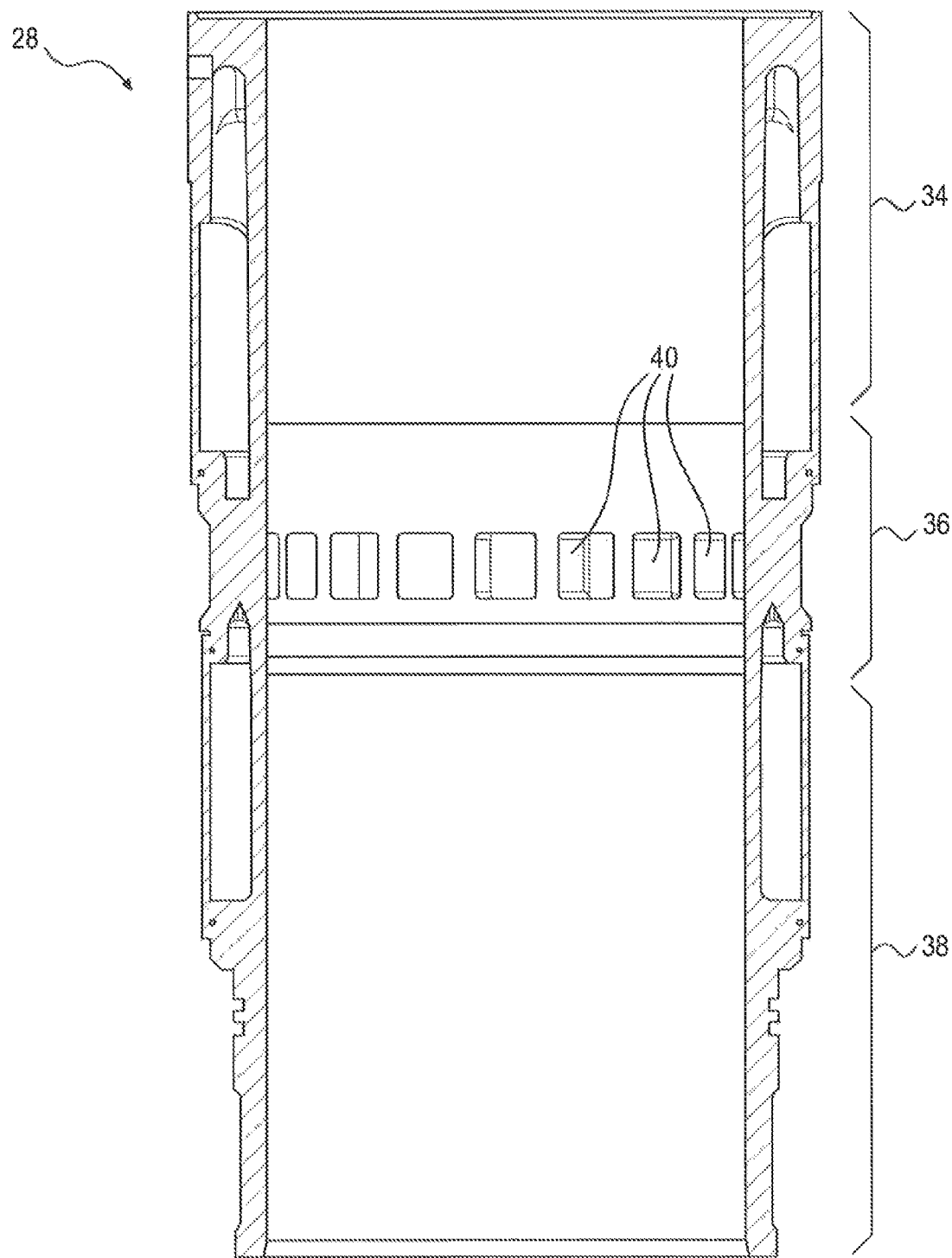
FIG. 2 is a cross-sectional view of an exemplary disclosed cylinder liner that may be used in conjunction with the engine of FIG. 1.

FIG. 2 illustrates a sectional view of an exemplary cylinder liner 28 that may be used to protect an associated cylinder 20 from wear and degradation caused by piston 12. Cylinder liner 28 may have a generally cylindrical shape and may be removably fitted within cylinder 20 in which piston 12 reciprocates. During operation of engine 10, cylinder liner 28 may form a sliding surface for piston 12 and the piston rings as piston 12 is driven in an up-and-down reciprocating motion by connecting rod 14 and crankshaft 16.

The inner surface of cylinder liner 28 may be divided into an upper section 34, a middle port relief section 36, and a lower section 38. Upper section 34 may be characterized by an axial length of approximately 1.5-2.5 times the axial length of middle port relief section 36. Lower section 38 may be characterized by an axial length of approximately 2-3.5 times the axial length of middle port relief section 36. Middle port relief section 36 may be characterized by intake ports 40 arranged at a common axial location around the circumference of cylinder liner 28. Intake ports 40 may be arranged such that the area above and below intake ports 40 are approximately equal. This arrangement may help ensure proper cylinder scavenging for engine 10, whereby fresh air for a new cycle may be introduced into cylinder 20 and rotation of crankshaft 16 may force any remaining exhaust from the previous power stroke from cylinder 20.

As piston 12 and/or the piston rings reciprocate within cylinder 20, they may impart damage to cylinder liner 28 in the form of scuffing. Scuffing may occur with the formation of local microscopic welds between piston 12 and/or the piston rings and cylinder liner 28. Scuffing may also result from the piston rings dragging debris passing through intake ports 40 across the inner surface of cylinder liner 28. To help reduce scuffing to cylinder liner 28, adequate lubrication at the sliding interface between piston 12 and cylinder liner 28 should be maintained. For this purpose, cylinder liner 28 may be provided with a variable surface finish such that higher degrees of roughness and porosity are applied to sections of cylinder liner 28 that may be subject to a greater risk of scuffing during engine operation. This roughness and porosity may facilitate oil retention at desired locations.

The surface roughness of cylinder liner 28 may be represented by a variety of roughness parameters, including, for example, arithmetic mean value $R_a$, mean roughness depth $R_z$, and root-mean-square average $R_q$. Of these, $R_a$ is more common and is therefore used to describe cylinder liner 28 of the present disclosure. $R_a$ may be calculated based on an average of the peaks and valleys associated with the surface of cylinder liner 28. Higher values of $R_a$ may indicate a higher degree of roughness. Conversely, lower values of $R_a$ may indicate a smoother finish.

The roughness characteristics of cylinder liner 28 may also be explained using $V_O$, a term known in the art to describe the volume of oil retained by scratches (e.g., cross-hatched grooves or cross-hatching) imparted to the sections of cylinder liner 28. $V_O$ may be a dimensionless unit. Higher values of $V_O$ may indicate higher volumes of retained oil and therefore a higher oil consumption. Accordingly, higher values of $V_O$ may correspond to higher values of $R_a$ and therefore a higher degree of roughness. Conversely, lower values of $V_O$ may indicate lower volumes of retained oil and therefore a lower oil consumption. Lower values of $V_O$ may therefore correspond to lower values of $R_a$ and consequently a smoother finish. With the parameters of $R_a$ and $V_O$ set forth above, the variable surface finish corresponding to the various lubrication needs of cylinder liner 28 of the present disclosure will now be described.

Lower section 38 of cylinder liner 28 may be subject to a reduced risk of scuffing relative to upper section 34 and middle port relief section 36 because the oil control rings positioned on the lower portion of piston 12 may not encounter as great a load as the compression rings positioned on the upper portion of piston 12. As such, lower section 38 may not require a significant amount of oil to counter the loading experienced between the compression rings and cylinder liner 28, and may therefore be provided with a smoother finish. In particular, lower section 38 may be provided with an $R_a$ value of approximately 15-25 micro-inches and a $V_O$ value of approximately 0.05-0.10. In such an arrangement, lower section 38 of cylinder liner 28 may be characterized by a reduced retention of lubricating oil. For example, as will be appreciated, lower section 38, relative to upper section 34 and middle port relief section 36, may require the least amount of lubrication of cylinder liner 28.

Upper section 34 of cylinder liner 28 may be subject to a higher risk of scuffing relative to lower section 38 due to the harsh pressure and temperature conditions of combustion chamber 18. For example, increased friction and pressure may be observed in upper section 34 at the interface of cylinder liner 26 and the piston rings. Upper section 34 may therefore require a higher degree of oil retention and may be provided with an $R_a$ value of approximately 15-35 micro-inches and a $V_O$ value of approximately 0.05-0.30. In such an arrangement, upper section 34 of cylinder liner 28 may be characterized by an intermediate degree of surface roughness and therefore an intermediate degree of oil retention relative to lower section 38 and middle port relief section 36.

Middle port relief section 36 of cylinder liner 28 may be subject to an increased risk of scuffing relative to upper and lower sections 34, 38, and may therefore require the highest degree of oil retention of cylinder liner 28. This increased risk may be associated with the severe pressure and temperature conditions experienced in this region of cylinder liner 28. As with upper section 34, increased friction and pressure may be observed between cylinder liner 28 and the piston rings. An increased loading on the piston rings may also occur as a result of the reduced area characterizing middle port relief section 36 due to the presence of intake ports 40. Whereas cylinder liner 28 may be characterized circumferentially by a generally full circle in upper and lower sections 34, 38, in middle port relief section 36, intake ports 40 may reduce the surface area available to support the same loads carried in upper and lower sections 34, 38. This results in a higher pressure between cylinder liner 28 and the piston rings in middle port relief section 36.

Additionally, middle port relief section 36 may also experience greater wear due to a tendency of piston 12 to deviate slightly from a perfectly linear up and down reciprocating motion and to instead obliquely strike cylinder liner 28. This may cause increased scuffing to the area above and below intake ports 40. Greater wear may also result from the piston rings dragging debris entering through intake ports 40 across the inner surface of cylinder liner 28.

Middle port relief section 36 may therefore be provided with an $R_a$ value of approximately 35-55 micro-inches and a $V_O$ value greater than approximately 0.10. In this arrangement, middle port relief section 36 may be characterized by the highest degree of surface roughness relative to upper and lower sections 34, 38 of cylinder liner 28. Middle port relief section 36, requiring the highest amount of lubrication of cylinder liner 28 for proper function of engine 10, may thus be provided with the greatest degree of oil retention.

In this manner, cylinder liner 2$ may be provided with a three-tiered surface finish in which the degree of roughness of each tier may correspond to the lubrication needs of the different sections that are subject to different conditions of temperature and pressure within cylinder 20. In this arrangement, cylinder liner 28 may be provided with adequate lubrication to both reduce friction and wear and to help decrease the potential for harmful particulate emissions.

Figure 3:
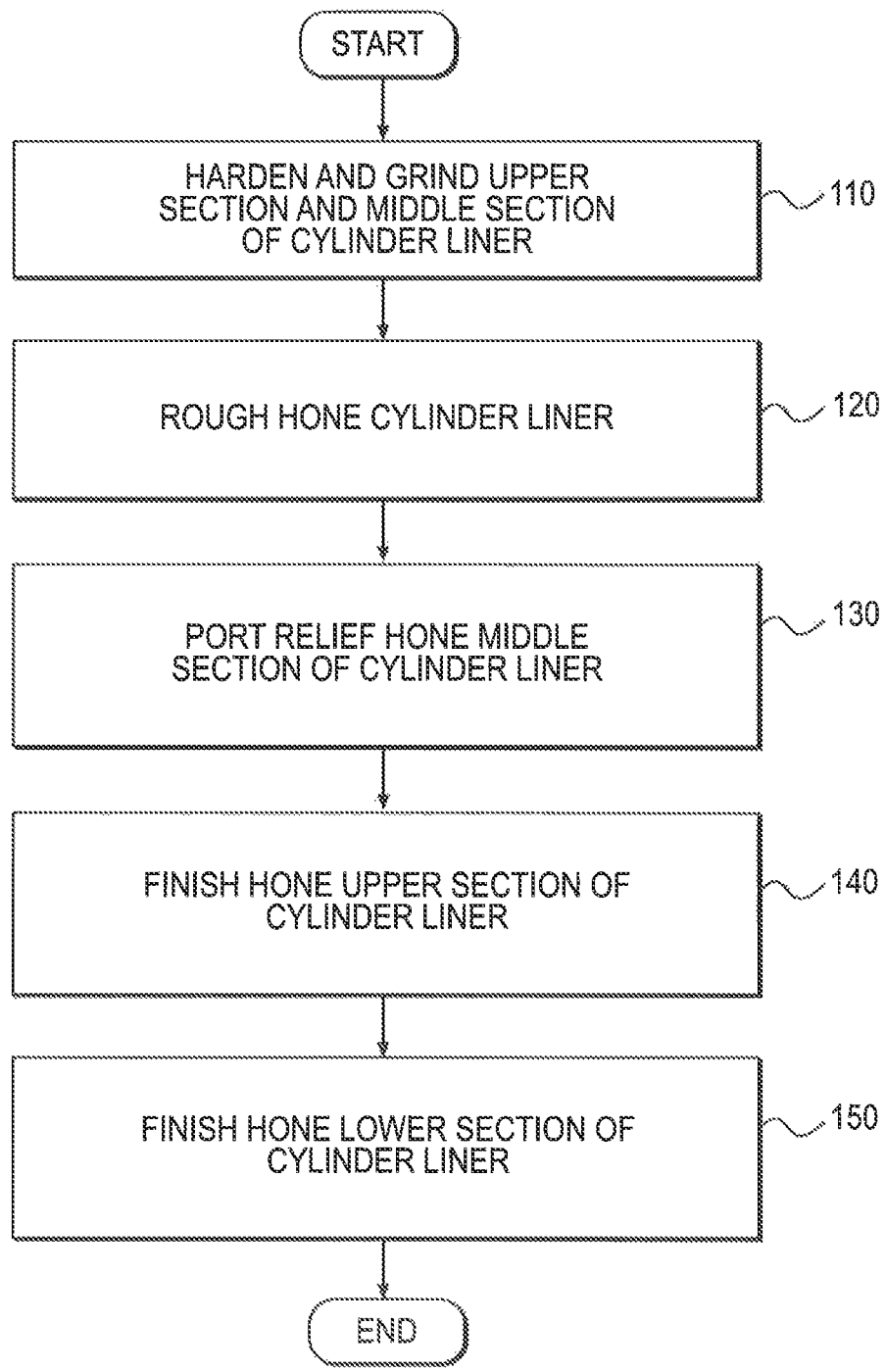
FIG. 3 is a flowchart depicting an exemplary disclosed method that may be used to produce the cylinder liner of FIG. 2.

FIG. 3 illustrates an exemplary method that may be used to produce cylinder liner 28. FIG. 3 will be discussed in more detail in the following section to further illustrate the disclosed concepts.

INDUSTRIAL APPLICABILITY

The disclosed cylinder liner may provide an efficient means to help reduce friction and wear in an engine such as, for example, a two-stroke diesel engine. In particular, the disclosed cylinder liner may help reduce the risk of scuffing that may result under the harsh pressure and temperature conditions of combustion chamber 18. The disclosed cylinder liner may be of particular application to uniflow two-stroke diesel engines that are especially vulnerable to scuffing because of particulates entering through intake ports 40 and being dragged along cylinder liner 28 during engine operation. In addition, the disclosed cylinder liner may help reduce harmful particulate emissions by reducing oil remaining on cylinder liner 28 from being burned in combustion chamber 18 and subsequently introduced into the atmosphere. In this regard, the disclosed cylinder liner may also beneficially help to reduce excess oil consumption generally.

FIG. 3 illustrates a flowchart depicting an exemplary method that may be used to produce cylinder liner 28. FIG. 3 will now be discussed in detail. The exemplary method illustrated in FIG. 3 may utilize honing, which may be recognized by one skilled in the art as an abrasive machining process that produces a particular finish for surfaces such as cylinder liner 28. Honing involves scrubbing an abrasive against cylinder liner 28 along a controlled path of upper section 34, middle port relief section 36, and lower section 38. This process may cut away irregularities and result in a more uniform finish. Such abrasives may be composed of irregularly shaped particles called grit and designated by a grit stone number. Lower grit stone numbers may produce a rougher finish. Conversely, higher grit stone numbers may produce a smoother finish. One skilled in the art will recognize that achieving a specific surface finish through honing may require the selection of a proper grade of abrasives and correctly adjusting the speed applied to such abrasives during the honing process. It should be noted that although honing may be recognized in the art, one skilled in the art will further recognize that the parameters and steps constituting the most suitable surface finish for cylinder liner 28 may be unique.

Before honing begins, cylinder liner 28 may be characterized by a surface of generally uniform texture. The subsequent honing process may produce a surface finish characterized by cross-hatching. This cross-hatching may provide the roughness needed to help cylinder liner 28 retain the lubricating oil necessary for proper functioning of engine 10. The cross-hatching of the present cylinder liner 28 may be manufactured through a five-step procedure involving honing. It is contemplated that these steps may be performed in the order described, in reverse order, or simultaneously, if desired.

In step 110, upper section 34 and middle port relief section 36 of cylinder liner 28 may be hardened. Hardness may be measured on several hardness scales, including, for example, the Brinnell scale and various levels of the Rockwell scale. Of these, the Rockwell C scale is more appropriate to describe cylinder liner 28 of the present disclosure because of its applicability to harder materials such as steel. The Rockwell C scale may be based on the indentation hardness associated with cylinder liner 28. Hardness measured on the Rockwell C scale may be a dimensionless unit. Higher values on the Rockwell C scale may indicate a harder material. Conversely, lower values on the Rockwell C scale may indicate a softer material.

The hardening of step 110 may involve hardening upper section 34 and middle port relief section 36 until a phase change is realized in cylinder liner 28 and a particular hardness greater than approximately 50 on the Rockwell C scale is reached. This hardness may not necessarily characterize the entire composition of cylinder liner 28. For example, this hardness may be of a thickness of approximately ten thousandth of an inch, extending from the inner surface of cylinder liner 28. The hardening of step 110 may utilize any of several methods known in the art to harden a material, including, for example, laser hardening or induction hardening. Laser hardening may involve treating cylinder liner 28 with a gas laser, such as a carbon dioxide laser. The laser beam may be focused on upper section 34 and middle port relief section 36 until a phase change is realized in cylinder liner 28. Similarly, induction hardening upper section 34 and middle port relief section 36 may involve heating and rapidly cooling upper section 34 and middle port relief section 36 using an induction heater until a particular hardness greater than approximately 50 on the Rockwell C scale is reached. Other hardening methods known in the art may also be used.

In this manner, step 110 may increase the porosity of upper section 34 and middle port relief section 36 by creating internal hardness. The porosity imparted to cylinder liner 28 may permit individual local pockets on its surface to hold more oil than, for example, lower section 38. This may provide a lubricated surface for the movement of piston 12 and/or the piston rings against cylinder liner 28. Hardening may be followed by grinding, if desired. Grinding may be applied to straighten and size cylinder liner 28.

In step 120, cylinder liner 28 may be rough honed with a 150 grit super-abrasive at a speed of approximately 250 RPM for approximately 2.5-3 minutes to provide a comparatively rough surface. In one example, the main bore of cylinder liner 28 may be rough-honed to approximately 9.058 inches. In step 130, middle port relief section 36 may be port relief honed with a 400 grit super-abrasive at a speed of approximately 175 RPM for approximately 2 minutes. Step 130 may utilize a cross-hatch angle of approximately 5-17°, which may affect $V_O$. In particular, this angle may help middle port relief section 36 retain more oil.

In step 140, upper section 34 may be finish honed with a 400 grit super-abrasive at a speed of 200 RPM for approximately 2.5-3 minutes. In step 150, lower section 38 may be finish honed with a 400 grit super-abrasive at a speed of approximately 200 RPM for approximately 2.5-3 minutes. Steps 140 and 150 may utilize a cross-hatch angle of approximately 30-40°, which may affect $V_O$. In particular, this angle may produce cross-hatching to upper and lower sections 34, 38 that promotes less oil retention.

The finish hone of step 140 may be applied in a manner such that contact is not made with middle port relief section 36. This may be achieved through different means. For example, in this embodiment, middle port relief section 36 is twelve thousandth of an inch larger than upper and lower sections 34, 38. The abrasives used in the honing process may therefore be arranged to travel only along middle port relief section 36 and avoid contact with upper and lower sections 34, 38. Other methods known in the art may also be utilized, including the use of a rubber covered cylindrical shield to cover middle port relief section 36 and expose upper and lower sections 34, 38 during these steps.

The disclosed method may produce a three-tiered surface finish in which upper section 34, middle port relief section 36, and lower section 38 exhibit variable surface roughness characteristics that provide for the lubrication needs of the respective sections. In particular, upper section 34 may be provided with an $R_a$ value of approximately 15-35 micro-inches and a $V_O$ value of approximately 0.05-0.30. Middle port relief section 36 may be characterized by an $R_a$ value of approximately 35-55 micro-inches and a $V_O$ value greater than approximately 0.10. Lower section 38 may be characterized by an $R_a$ value of approximately 15-25 micro-inches and a $V_O$ value of approximately 0.05-0.10. One skilled in the art will recognize that the degree of roughness, as measured by an $R_a$ value, will vary slightly throughout the extent of the respective portions of cylinder liner 28 due to mechanical deficiencies associated with the super-abrasives used for honing cylinder liner 28. A similar variation may be associated with $V_O$ values.

In this manner, upper section 34, middle port relief section 36, and lower section 38 may be provided with an amount of oil correlating to their respective lubrication needs. For example, lower section 38 may be provided with a smoother finish because the oil control rings positioned on lower portion of piston 12 may not encounter as great a load as the compression rings positioned on upper portion of piston 12. As such, lower section 38 may not require increased oil to counter the loading experienced between the compression rings and cylinder liner 28. Similarly, middle port relief section 36 may be provided with a high degree of surface roughness to satisfy its higher lubrication needs due to an increased load on the piston rings caused by engine dynamics and the reduced area between the piston rings and cylinder liner 28.

It will be apparent to those skilled in the art that various modifications and variations can be made to the disclosed cylinder liner without departing from the scope of the disclosure. Other embodiments of the cylinder liner will be apparent to those skilled in the art from consideration of the specification and practice of the cylinder liner disclosed herein. It is intended that the specification and examples be considered as exemplary only, with a true scope of the disclosure being indicated by the following claims and their equivalents.

What is claimed is:

1. A cylinder assembly, comprising:
   a cylinder;
   a piston disposed within the cylinder, and configured to reciprocate within the cylinder along a longitudinal direction of the cylinder;
   a plurality of piston rings encircling the piston; and
   a cylinder liner fitted around the piston in a cylindrical space in which the piston reciprocates, wherein:
   the cylinder liner includes an upper section, a middle section, and a lower section;
   the upper section is composed of a first texture, wherein the first texture is characterized by an oil retaining volume Vo of 0.05-0.30;
   the middle section is composed of a second texture that is rougher than the first texture; and
   the lower section is composed of a third texture that is smoother than the first texture and the second texture.

2. The cylinder assembly of claim 1, wherein the first texture is characterized by an arithmetic mean roughness Ra of 15-35 micro-inches.

3. The cylinder assembly of claim 2, wherein the second texture is characterized by an arithmetic mean roughness Ra of 35-55 micro-inches.

4. The cylinder assembly of claim 3, wherein the third texture is characterized by an arithmetic mean roughness Ra of 15-25 micro-inches.

5. The cylinder assembly of claim 1, wherein the second texture is characterized by an oil retaining volume Vo greater than 0.10.

6. The cylinder assembly of claim 5, wherein the third texture is characterized by an oil retaining volume Vo of 0.05-0.10.

7. A method for producing a cylinder liner having an upper section, a middle section, and a lower section, comprising:
   hardening the upper section and the middle section;
   rough honing the cylinder liner with a 150 grit super-abrasive at a speed of 250 RPM;
   port relief honing the middle section with a 400 grit super-abrasive at a speed of 175 RPM;
   finish honing the upper section with a 400 grit super-abrasive at a speed of 200 RPM; and
   finish honing the lower section with a 400 grit super-abrasive at a speed of 200 RPM.

8. The method of claim 7, wherein hardening the upper section and the middle section includes hardening until a hardness of at least a portion of the upper section and at least a portion of the middle section have a hardness greater than 50 on the Rockwell C scale.

9. The method of claim 7, wherein port relief honing the middle section results in a crosshatch angle of 5-17°.

10. The method of claim 7, wherein finish honing the upper section and the lower section results in a cross-hatch angle of 30-40°.

11. The method of claim 7, wherein finish honing the upper section includes finish honing until a surface finish of the upper section has an arithmetic mean roughness Ra of 15-35 micro-inches.

12. The method of claim 11, wherein port relief honing the middle section includes port relief honing until a surface finish of the middle section has an arithmetic mean roughness Ra of 35-55 micro-inches.

13. The method of claim 12, wherein finish honing the lower section includes finish honing until a surface finish of the lower section has an arithmetic mean roughness Ra of 15-25 micro-inches.

14. The method of claim 7, wherein finish honing the upper section includes finish honing until the upper section has an oil retaining volume Vo of 0.05-0.30.

15. The method of claim 14, wherein port relief honing the middle section includes port relief honing until the middle section has an oil retaining volume Vo greater than 0.10.

16. The method of claim 15, wherein finish honing the lower section includes finish honing until the lower section has an oil retaining volume Vo of 0.05-0.10.

17. The method of claim 7, wherein rough honing the cylinder liner is performed for 2.5-3 minutes, port relief honing the middle section is performed for 2 minutes, finish honing the upper section is performed for 2.5-3 minutes, and finish honing the lower section is performed for 2.5-3 minutes.

18. The method of claim 7, further including grinding the upper section and the middle section.

19. A cylinder liner comprising an upper section, a middle section, and a lower section, wherein:
- the upper section is composed of a first texture, wherein the first texture is characterized by an oil retaining volume Vo of 0.05-0.30;
- the middle section is composed of a second texture that is rougher than the first texture; and
- the lower section is composed of a third texture that is smoother than the first texture and the second texture.

\* \* \* \* \*